(12) United States Patent
Eskenazi et al.

(10) Patent No.: US 8,047,378 B2
(45) Date of Patent: Nov. 1, 2011

(54) REUSABLE SHIPPING CONTAINER

(75) Inventors: Ken Eskenazi, Los Angeles, CA (US);
Barent Roth, Santa Monica, CA (US);
Anthony Guido, Philadelphia, PA (US)

(73) Assignee: Ken Eskenazi, Los Angeles, CA (US)

( * ) Notice: Subject to any disclaimer, the term of this patent is extended or adjusted under 35 U.S.C. 154(b) by 0 days.

(21) Appl. No.: 12/604,370

(22) Filed: Oct. 22, 2009

(65) Prior Publication Data
US 2010/0101974 A1    Apr. 29, 2010

Related U.S. Application Data

(63) Continuation-in-part of application No. 11/865,714, filed on Oct. 1, 2007.

(51) Int. Cl.
*B65D 85/30* (2006.01)
(52) U.S. Cl. ........................ 206/591; 206/594
(58) Field of Classification Search ................. 206/594, 206/583, 591, 521.8, 592, 499, 508; 229/406; 220/406, 4.21, 23.89, 592.25, 655, 902, 528
See application file for complete search history.

(56) References Cited

U.S. PATENT DOCUMENTS

| | | | | |
|---|---|---|---|---|
| 1,063,894 A | * | 6/1913 | Smith | 206/591 |
| 1,813,256 A | * | 7/1931 | Radkus | 206/594 |
| 2,282,908 A | * | 5/1942 | Thompson | 206/523 |
| 2,681,142 A | * | 6/1954 | Cohen | 206/522 |
| 3,256,975 A | | 6/1966 | Puente | |
| 3,412,888 A | * | 11/1968 | Andrews et al. | 220/4.21 |
| 3,552,595 A | | 1/1971 | Gerner et al. | |
| 3,567,013 A | | 3/1971 | Tannebaum | |
| 3,961,708 A | | 6/1976 | von Dohlen et al. | |
| 3,979,020 A | | 9/1976 | Braber et al. | |
| 3,999,661 A | | 12/1976 | Jones | |
| 4,155,453 A | * | 5/1979 | Ono | 206/522 |
| 4,759,444 A | * | 7/1988 | Barmore | 206/521.1 |
| 4,852,743 A | * | 8/1989 | Ridgeway | 206/583 |
| 4,903,827 A | * | 2/1990 | Phelps et al. | 206/204 |
| 5,069,354 A | * | 12/1991 | Tannenbaum | 220/4.22 |
| 5,183,159 A | | 2/1993 | Hojnacki et al. | |
| 5,218,510 A | * | 6/1993 | Bradford | 361/220 |
| 5,405,000 A | | 4/1995 | Hagedon et al. | |
| 5,553,444 A | | 9/1996 | Lovecky et al. | |

(Continued)

OTHER PUBLICATIONS

Eskenazi, "EPA—The Rapioli," http://www.cleanagency.com, Oct. 2003, 1 sheet; Clean Agency, Pasadena, California.

(Continued)

*Primary Examiner* — Mickey Yu
*Assistant Examiner* — Jenine Pagan
(74) *Attorney, Agent, or Firm* — Christie, Parker & Hale, LLP

(57) ABSTRACT

The present invention relates to shipping containers, and more particularly to a reusable shipping container with reusable cushioning. In one embodiment, a reusable shipping container for shipping an item includes first and second outer trays, and first and second cushions. Each cushion is received in one of the outer trays, and each cushion has an open, hollow dome. The dome extends substantially across the respective outer tray. The first and second outer trays are engageable to close the container, with the domes of the first and second cushions facing each other. Each dome is made of a resilient material that is deflectable into a substantially concave bowl to receive an item between the facing domes during shipment.

16 Claims, 16 Drawing Sheets

U.S. PATENT DOCUMENTS

| | | |
|---|---|---|
| 5,641,068 A | 6/1997 | Warner |
| 5,699,925 A | 12/1997 | Petruzzi |
| 5,738,216 A | 4/1998 | Warner |
| 5,769,235 A * | 6/1998 | Keach et al. .......... 206/583 |
| 5,954,203 A | 9/1999 | Marconi |
| 6,065,870 A | 5/2000 | Nunez |
| 6,513,658 B1 | 2/2003 | Adkins |
| 6,520,333 B1 | 2/2003 | Tschantz |
| 6,520,337 B2 | 2/2003 | Smith |
| D516,388 S | 3/2006 | Wells |
| 2006/0042995 A1 | 3/2006 | McGrath et al. |

OTHER PUBLICATIONS

U.S. Environmental Protection Agency, "Rapioli," http://www.epa.gov/, Oct. 2003, 1 sheet, United States Environmental Protection Agency, Washington, D.C.

* cited by examiner

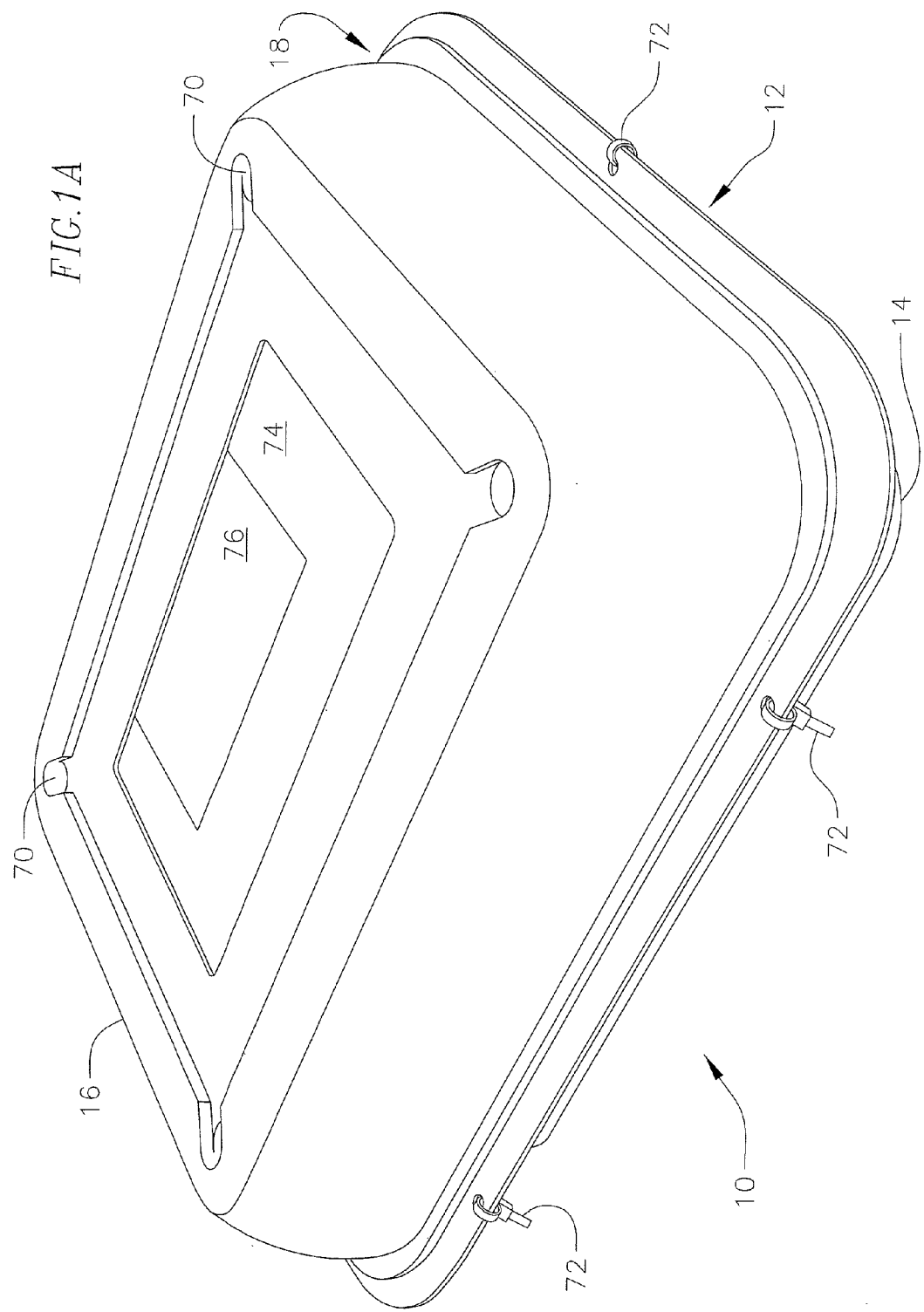

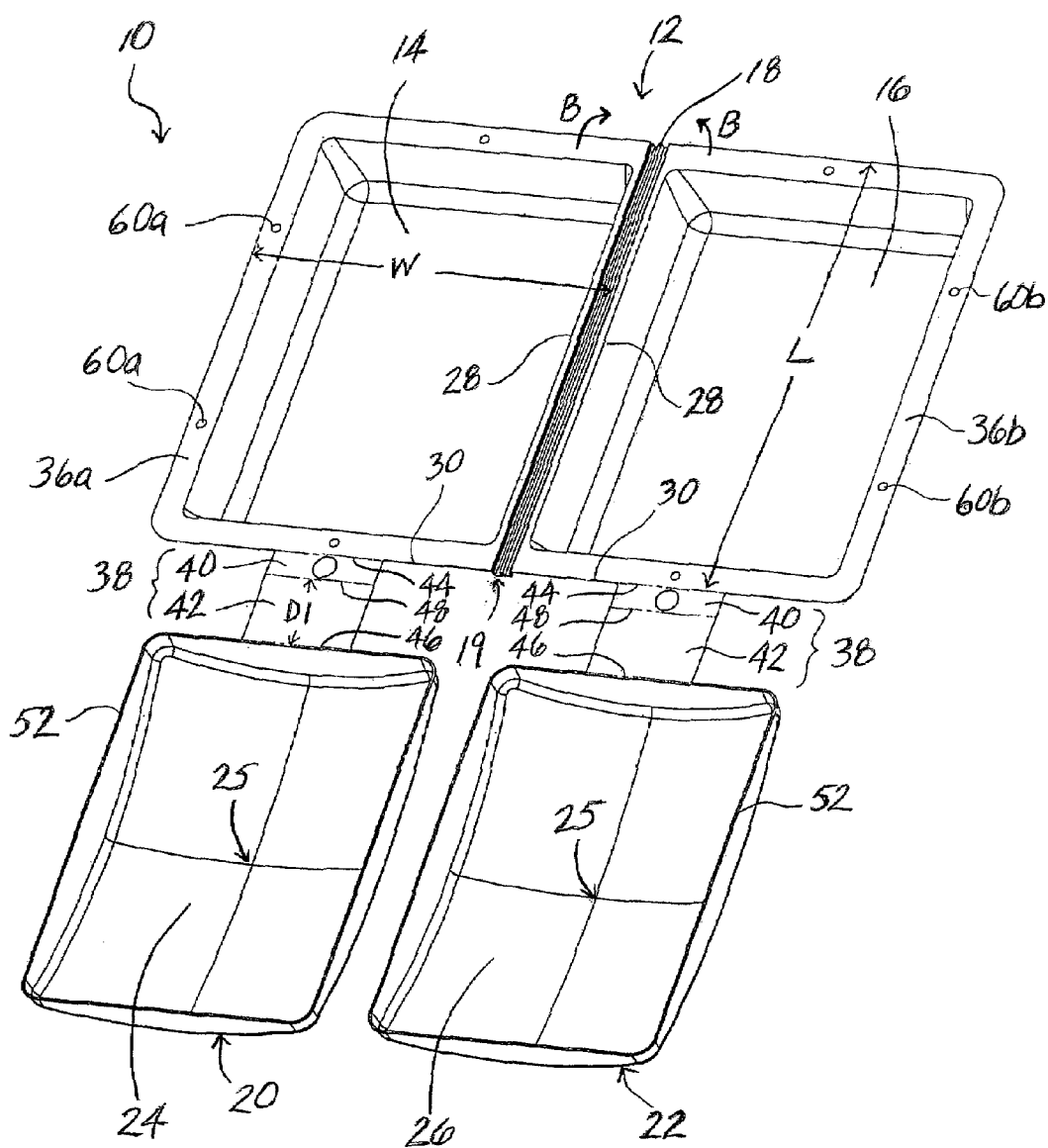

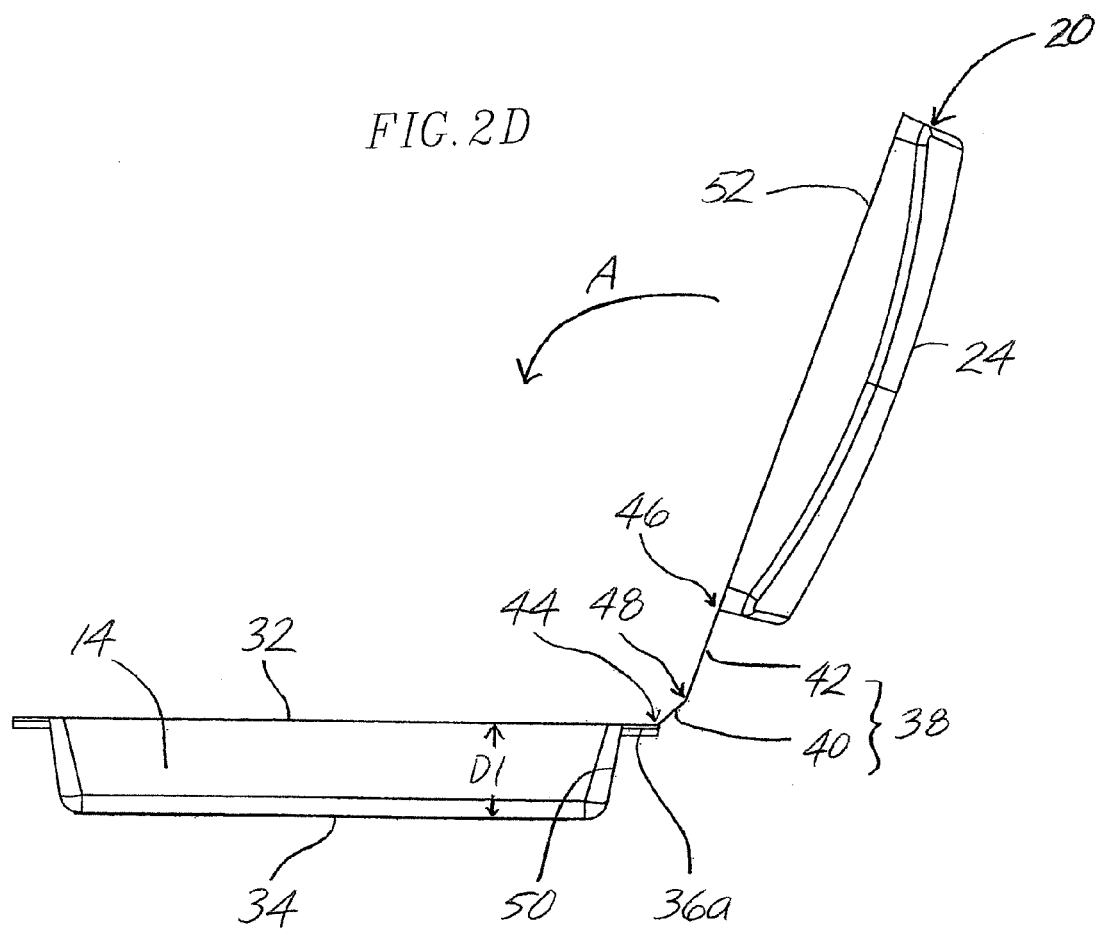

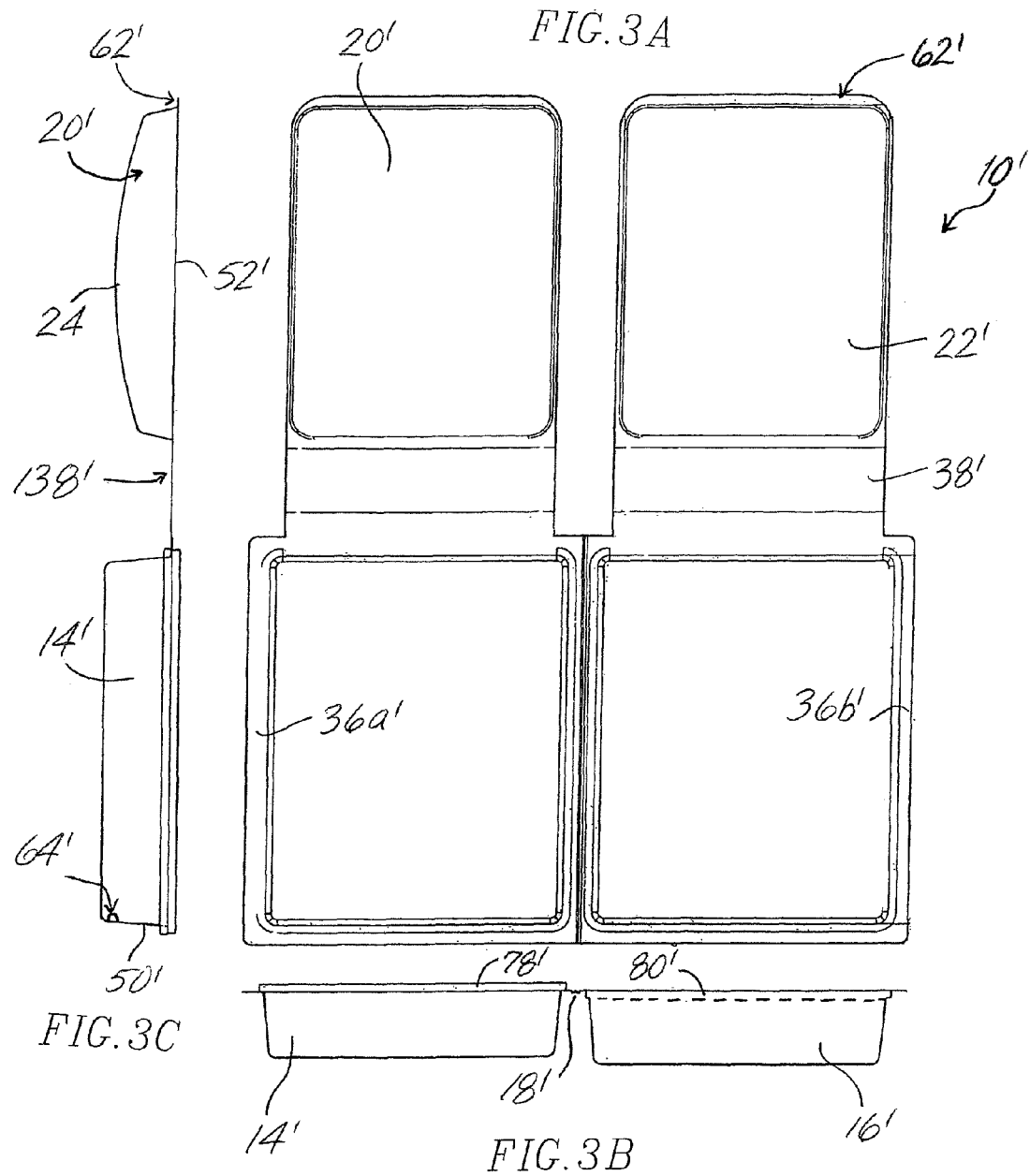

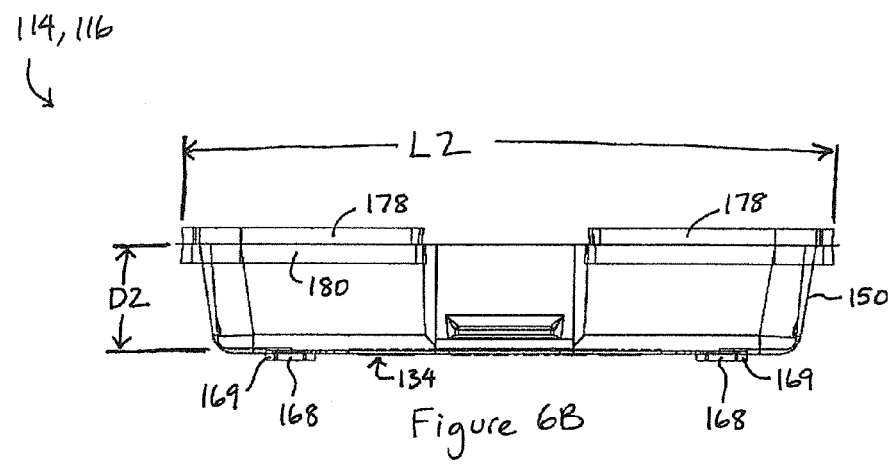
Figure 6B
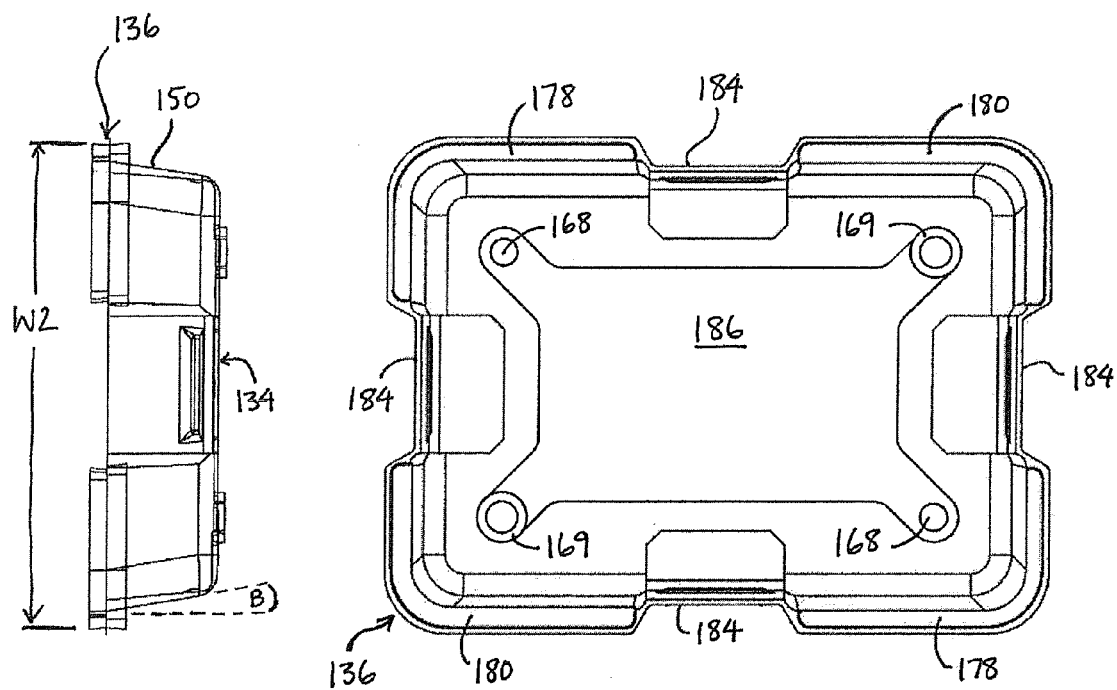
Figure 6C
Figure 6A

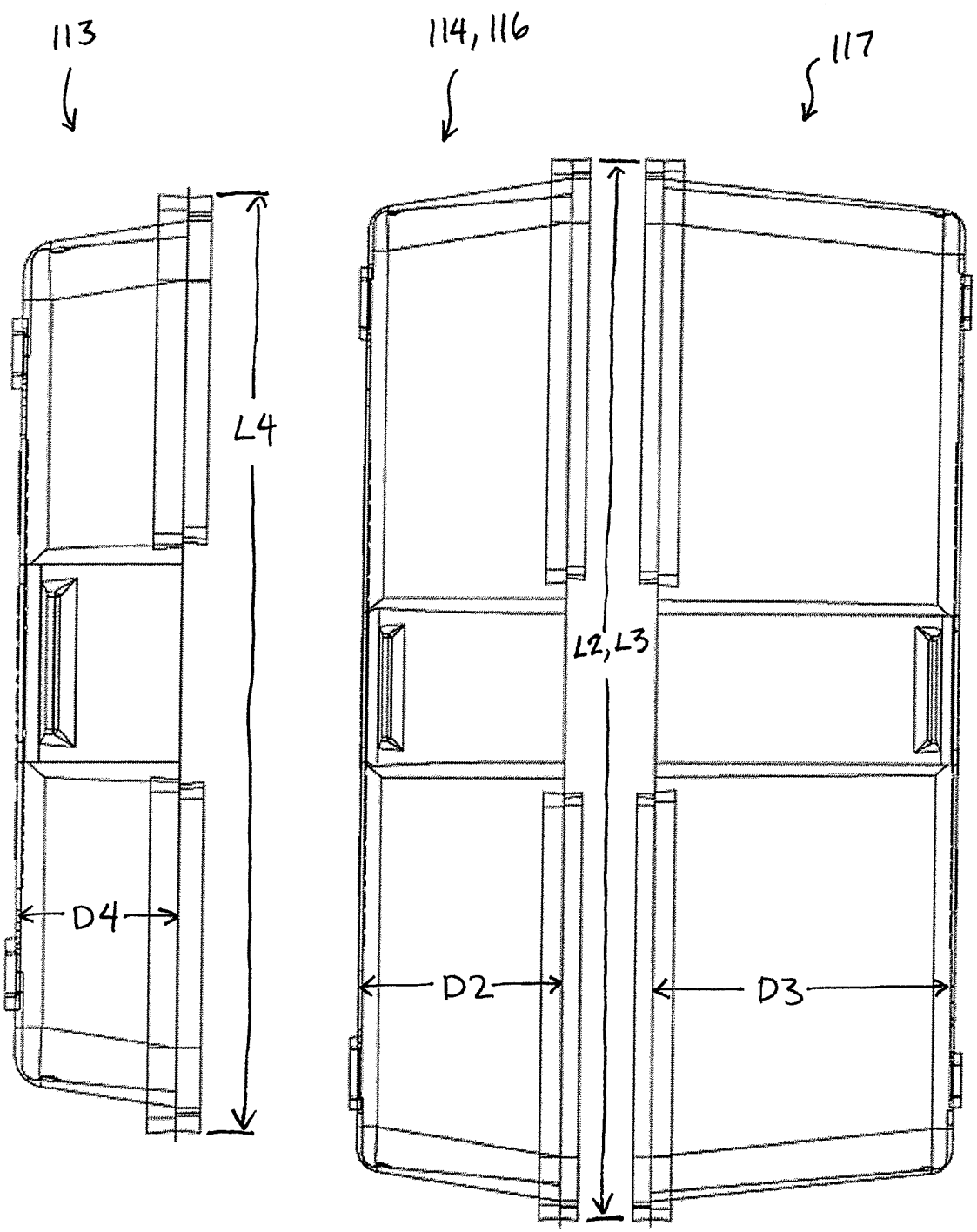

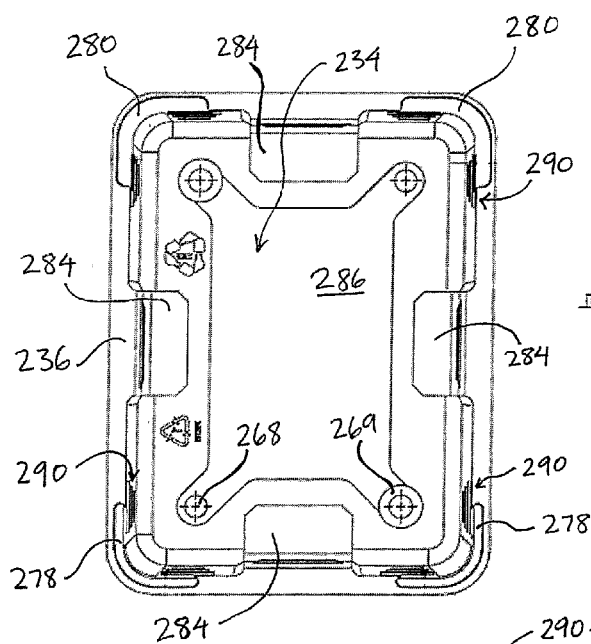
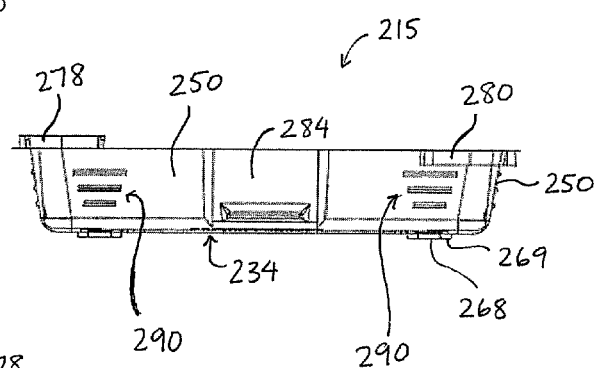
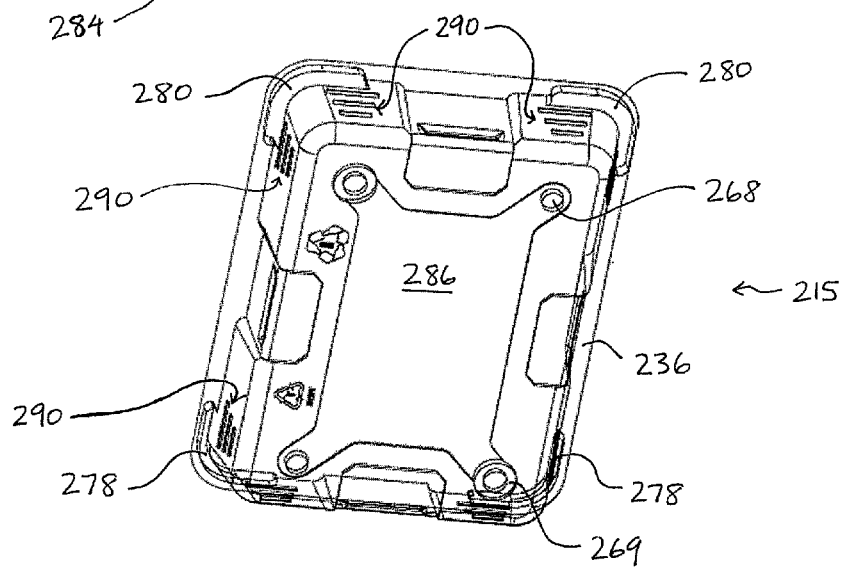
Figure 11B
Figure 11C
Figure 11A

REUSABLE SHIPPING CONTAINER

CROSS-REFERENCE TO RELATED APPLICATION(S)

This application is a continuation-in-part of U.S. patent application Ser. No. 11/865,714 filed Oct. 1, 2007, published as Publication No. 2009/0084703, the entire contents of which are incorporated by reference herein.

FIELD OF THE INVENTION

The present invention relates to shipping containers, and more particularly to a reusable shipping container with reusable cushioning.

BACKGROUND

Shipping containers often include disposable packing or cushioning materials that are placed inside an outer container to cushion and protect the product being shipped. These materials, such as foam blocks, crinkled paper, bubble wrap, peanuts, and other types of packaging, are typically disposed of when the product reaches its destination. This method of shipping produces large amounts of waste material.

Some shipping containers attempt to remedy this problem by utilizing containers that are specially molded to carry a specific item. For example, such a container may include a concave, molded recess that matches the shape of a product being shipped. The product being shipped is protected inside this custom molded recess, so the container requires less disposable cushioning material to safely ship the product. However, the container cannot be reused unless the next product being shipped is the same shape as the first one, so that it can fit into the same concave molded recess. Other prior art shipping containers consist of multiple different pieces and/or materials that are assembled together to form a cushioning container. These containers are complicated and expensive and often create large amounts of waste material.

Accordingly, there is still a need for a shipping container that can be reused for many different products and that cushions and protects the products without generating large amounts of waste material.

SUMMARY OF THE INVENTION

The present invention relates to shipping containers, and more particularly to a reusable shipping container with reusable cushioning. In one embodiment, the reusable shipping container includes two flexible pillows that fit inside two outer trays. The pillows are formed in a domed shape and are made out of a flexible material that can deflect and then recover its original domed shape. When the two trays are brought together to close the container, the two domed pillows are also brought together, facing each other. An item is placed between them, causing the pillows to deflect into substantially concave bowls around the item, thereby cushioning the item during shipment. After shipping, the item is removed, and the pillows spring back to their domed shape, ready to receive another item of a different shape or size. The container can be re-used many times to ship items of varying sizes, without producing any waste material. In one embodiment, the domed pillows and the outer trays are made of the same material. In one embodiment, that material is recycled polyethylene terephthalate (RPET).

In one embodiment according to the invention, a reusable shipping container includes an outer clamshell container, and first and second inner cushions. The outer clamshell container includes a first outer section and a second outer section connected to each other along an outer section hinge. The first inner cushion is connected to the first outer section along a first cushion hinge, and the second inner cushion connected to the second outer section along a second cushion hinge. The first and second inner cushions have first and second convex pillows. The first inner cushion is foldable along the first cushion hinge to position the first convex pillow inside the first outer section, and the second inner cushion is foldable along the second cushion hinge to position the second convex pillow inside the second outer section. The first and second convex pillows face each other when the first and second outer sections are folded together along the outer section hinge. The outer clamshell container, the first and second outer sections, the outer section hinge, the first and second inner cushions, the first and second convex pillows, and the first and second cushion hinges are integrally formed from one common material.

In another embodiment according to the invention, a reusable shipping container for shipping an item includes an outer container and first and second inner sections. The outer container has first and second clamshell sections hingedly connected to each other. The first inner section is hingedly connected to the first clamshell section and includes a first pillow with a convex bulge. The second inner section is hingedly connected to the second clamshell section and includes a second pillow with a convex bulge. The first inner section is pivotable with respect to the first clamshell section to position the first pillow in the first clamshell section, and the second inner section is pivotable with respect to the second clamshell section to position the second pillow in the second clamshell section, such that the convex bulges of the first and second pillows face each other when the outer container is closed. The first and second pillows are deflectable into a concave shape to receive the item between them, with the first and second pillows urging against the item to return toward their convex bulges. The outer container and the first and second inner sections are integrally formed from one material.

In another embodiment according to the invention, a reusable shipping container for shipping an item includes an outer clamshell carton and first and second convex pillows. The outer clamshell carton has first and second receptacles foldable toward each other along a hinge. The first convex pillow is foldable in and out of the first receptacle, and the second convex pillow is foldable in and out of the second receptacle. The first and second convex pillows face each other when they are folded into the respective first and second receptacles and the outer clamshell carton is closed. The first and second convex pillows are resilient to deflect into a concave shape with the item between them. The outer clamshell carton, the hinge, and the first and second convex pillows are integrally molded from one material.

In yet another embodiment according to the invention, a method of manufacturing a reusable shipping container includes providing a mold with an outer clamshell container and first and second inner cushions. The method also includes vacuum forming a sheet of material into the mold to form a molded portion of the sheet of material, and cutting a perimeter around the molded portion of the sheet of material. The method also includes forming living hinges in the molded portion of the sheet, and cooling the molded portion.

In one embodiment, a reusable shipping container for shipping an item includes first and second outer trays, and first and second cushions. Each cushion is received in one of the outer trays, and each cushion has an open, hollow dome. The dome extends substantially across the respective outer tray. The first and second outer trays are engageable to close the container, with the domes of the first and second cushions facing each other. Each dome is made of a resilient material that is deflectable into a substantially concave bowl to receive an item between the facing domes during shipment.

In one embodiment, a system for shipping items includes a plurality of trays, each tray having a bottom wall, a side wall, and an open top, and having a first depth from the open top to the bottom wall; and a plurality of pillows, each pillow having a hollow dome and an open bottom, the dome being formed from a resilient material that is deflectable to receive an item between two facing domes. Each pillow is sized to fit into one of the trays, with the dome of the pillow facing outwardly and extending substantially across a length of the tray. Each tray is engageable with another tray to close the container.

In one embodiment, a reusable shipping container for shipping an item includes an outer container including first and second trays each having a rim, the first and second trays being engageable along their rims to close the outer container; and a first pillow received into the first tray and extending substantially across a length of the first tray; and a second pillow received into the second tray and extending substantially across a length of the second tray. Each pillow comprises a hollow dome and an open bottom side, and the first and second pillows face each other when the outer container is closed. The first and second pillows are resilient and deflect into a substantially concave shape to receive an item between them, and the pillows have shape memory that returns the pillows to their dome shape when such item is removed. The first and second trays and the first and second pillows are separate pieces and are made from the same material. The first and second trays have a first thickness, and the first and second pillows have a second thickness, and the first thickness is greater than the second thickness.

BRIEF DESCRIPTION OF THE DRAWINGS

FIG. 1A is a top perspective view of a reusable shipping container in a closed position, according to an embodiment of the present invention.

FIG. 2C is a perspective view of the reusable shipping container of FIG. 2A, in an unfolded position.

FIG. 2D is a side elevational view of the reusable shipping container of FIG. 2A, in a partially folded position.

FIG. 3A is a plan view of a reusable shipping container in an unfolded position, according to another embodiment of the present invention.

FIG. 3B is a front elevational view of the reusable shipping container of FIG. 3A.

FIG. 3C is a left side elevational view of the reusable shipping container of FIG. 3A.

FIG. 6A is a top view of the tray of FIG. 5.

FIG. 6B is a side elevational view of the tray of FIG. 5.

FIG. 6C is a front elevational view of the tray of FIG. 5.

FIG. 11A is a perspective view of a tray according to an embodiment of the invention.

FIG. 11B is a top view of the tray of FIG. 11A.

FIG. 11C is a side elevational view of the tray of FIG. 11A.

DETAILED DESCRIPTION OF THE INVENTION

The present invention relates to shipping containers, and more particularly to a reusable shipping container with reusable cushioning. In one embodiment, the reusable shipping container includes two flexible pillows that fit inside two outer trays. The pillows are formed in a domed shape and are made out of a flexible material that can deflect and then recover its original domed shape. When the two trays are brought together to close the container, the two domed pillows are also brought together, facing each other. An item is placed between them, causing the pillows to deflect into substantially concave bowls around the item, thereby cushioning the item during shipment. After shipping, the item is removed, and the pillows spring back to their domed shape, ready to receive another item of a different shape or size. The container can be re-used many times to ship items of varying sizes, without producing any waste material. In one embodiment, the domed pillows and the outer trays are made of the same material. In one embodiment, that material is recycled polyethylene terephthalate (RPET).

Figure 1B:
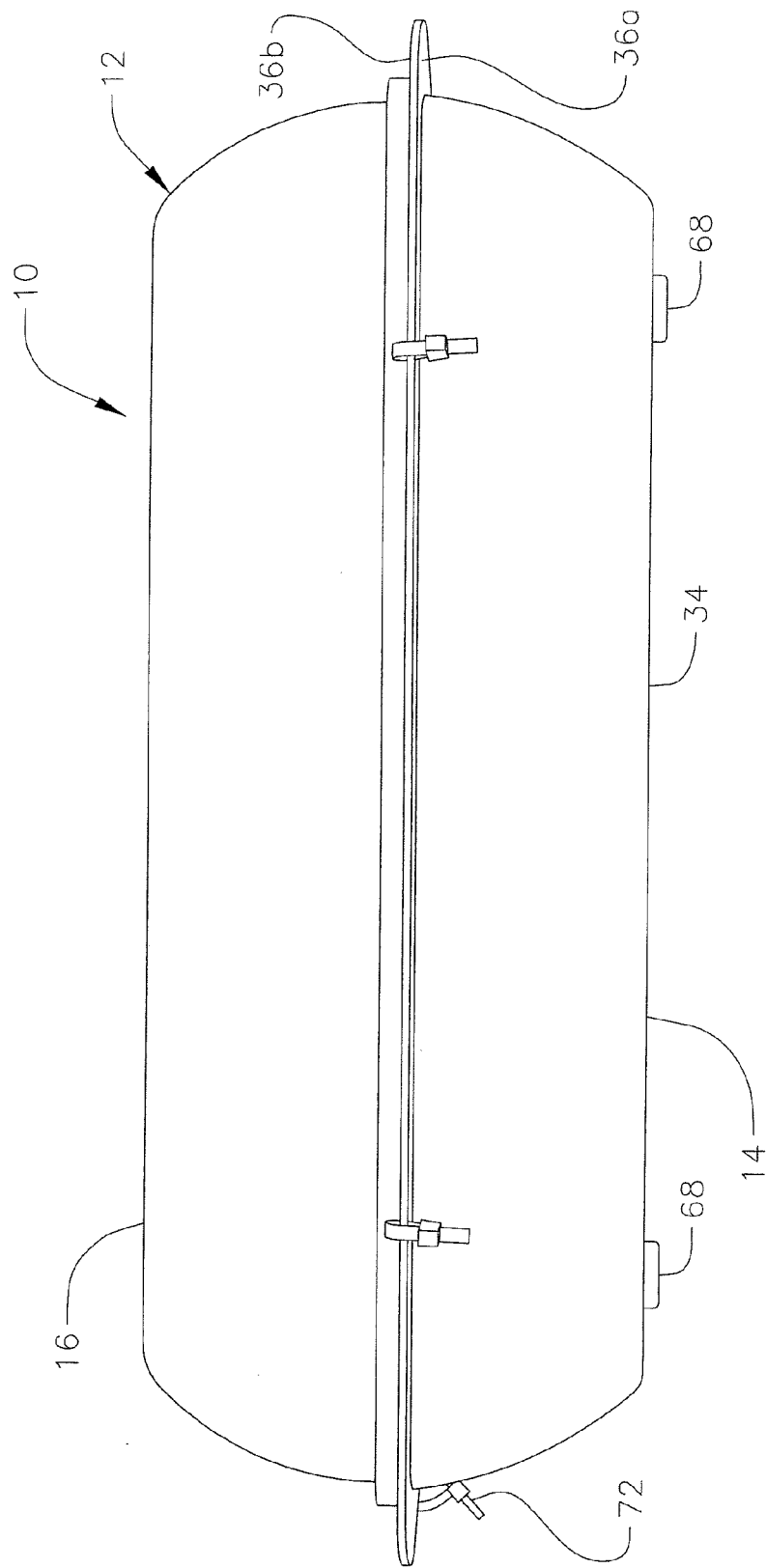
FIG. 1B is a side elevational view of the reusable shipping container of FIG. 1A.

A reusable shipping container according to one embodiment of the present invention is shown in FIGS. 1A-1B. The reusable shipping container 10 includes an outer clamshell container 12 with first and second outer sections or trays 14, 16 that fold toward each other along a flexible living hinge 18. Inside the outer clamshell container 12, two inner pillows (not shown in FIGS. 1A-1B) resiliently cushion the item being shipped. When the shipping container 10 arrives at its destination, the item being shipped can be removed, and the shipping container 10 is then ready to ship another item. The container 10 can be reused multiple times to ship items of various sizes, without producing any waste material.

Figure 2A:
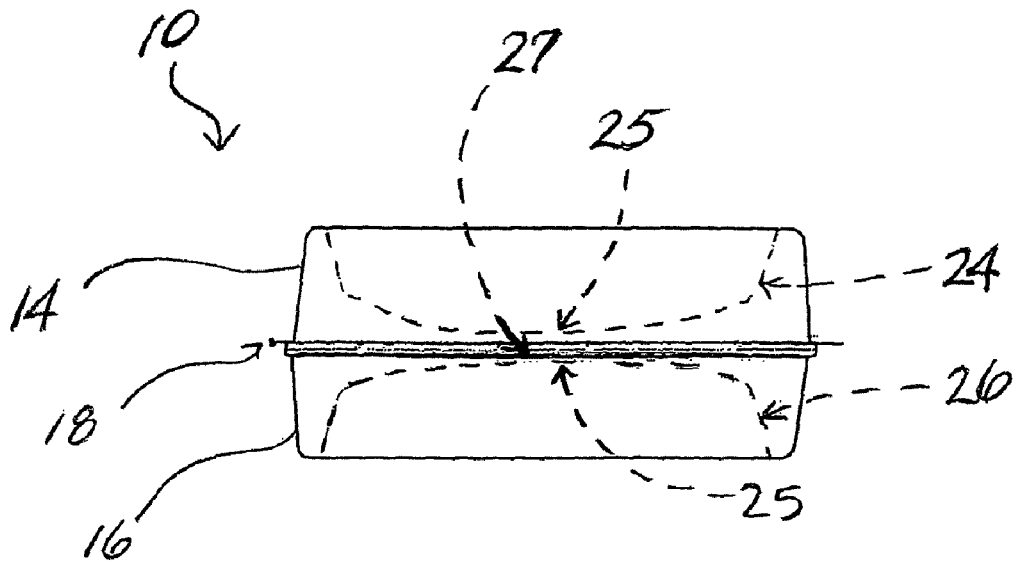
FIG. 2A is a side elevational view of a reusable shipping container in a closed position, according to an embodiment of the present invention.
Figure 2B:
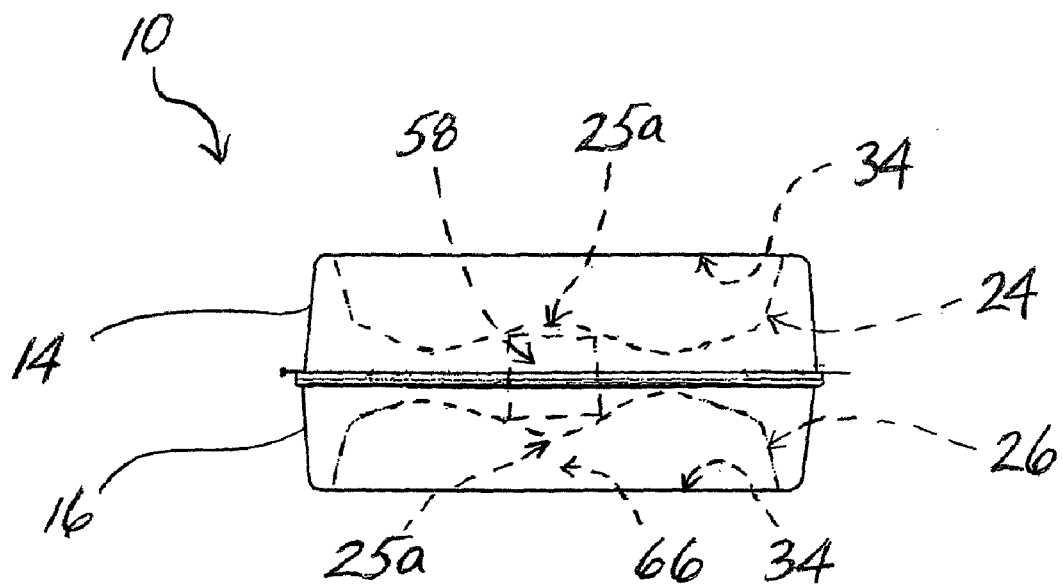
FIG. 2B is a side elevational view of the reusable shipping container of FIG. 2A, with an item placed inside.

The two inner pillows or cushions 24, 26 are indicated by dashed lines in FIGS. 2A-2B. The pillows 24, 26 each have a convex bulge or dome 25 in the center of the pillow. In FIGS. 2A and 2B, the outer clamshell container 12 is closed, positioning the pillows 24, 26 with their convex bulges 25 facing each other, with a space 27 between them. The pillows 24, 26 are resilient, such that they can be deflected from and can recover their convex shape. As shown in FIG. 2B, the convex bulges 25 of the two pillows deflect into concave bowls 25a to receive an item 58 between them. The pillows 24, 26 are resilient and have shape memory such that they are urged to return toward their original convex shape. As a result, the concave bowl 25a of each pillow urges against the item 58 as the pillow tries to recover its convex bulge 25. The two pillows thus hold the item 58 in place between them, as each pillow urges toward the item 58 from opposite sides. The two pillows together form two matching bowls 25*a* on either side of the item to resiliently cushion the item and hold it in place.

In the embodiment shown in FIG. 2B, each of the deflected concave bowls 25*a* leaves a space 66 between itself and a bottom wall 34 of the outer container 14, 16. This space 66 provides some buffer for the item 58 to shift or move on the resilient pillow without coming into contact with the bottom wall 34. If the bottom wall 34 is damaged, the item 58, spaced away from the wall, is still protected.

The reusable shipping container 10 is shown in its open, unfolded position in FIG. 2C. The view in FIG. 2C is looking down into the container, with the open tops of the outer sections 14, 16 facing up in the drawing. The bulges 25 of the pillows 24, 26 are facing down into the page. The two outer sections 14, 16 are opened along the living hinge 18. The two outer sections 14, 16 have a generally rectangular shape with the hinge 18 joining them along one of their longer edges 28. In other embodiments, the outer sections can take on different shapes and/or be joined along different edges, such as along their shorter edges 30. The hinge 18 is a living hinge formed by creating one or more thinner regions in the material joining the two sections 14, 16. This thinner region is easier to bend than thicker regions, creating a natural, flexible hinge. The two outer sections 14, 16 can be rotated and folded about and along this hinge as indicated by arrows B until their outer rims 36*a*, 36*b* contact each other, bringing the outer clamshell container 12 to a closed position, as seen in FIG. 2A. The hinge 18 may include grooves or other folding details to increase flexibility.

Two inner sections 20, 22 support the two convex pillows 24, 26. These two inner sections 20, 22 are rotatable and foldable into the respective outer sections 14, 16 as indicated by arrow A. A bridge 38 connects each inner section 20, 22 to the respective outer section 14, 16. A living hinge 44 connects the bridge 38 to the outer section 14, 16, and another living hinge 46 connects the bridge 38 to the inner section 20, 22. The bridge 38 itself is divided by a third living hinge 48 into a rim portion 40 and a wall portion 42.

Figure 2E:
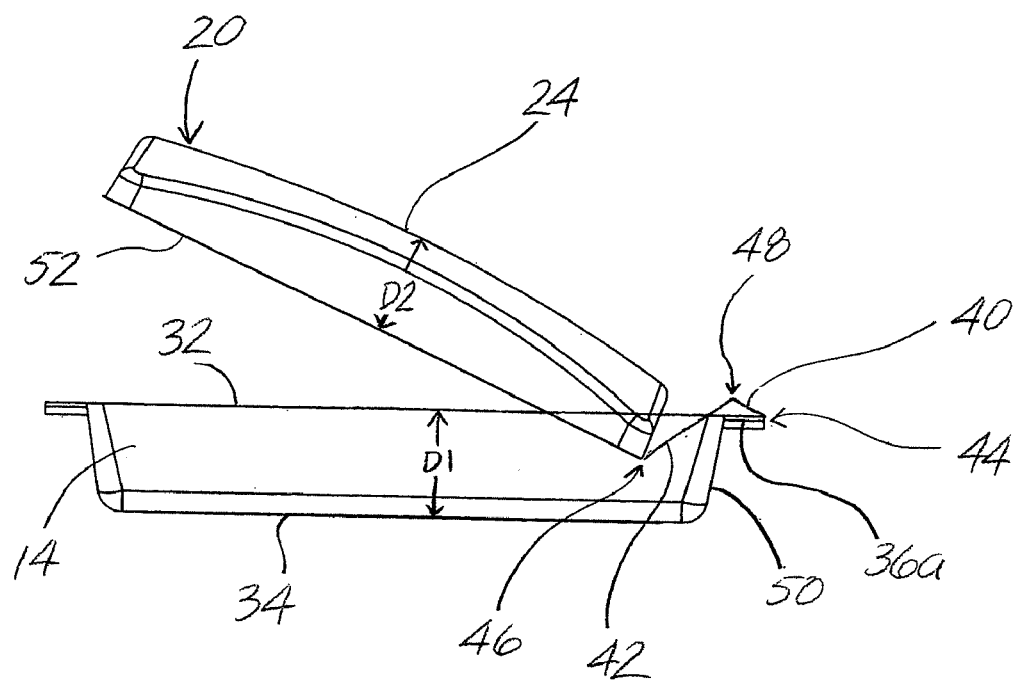
FIG. 2E is a side elevational view of the reusable shipping container of FIG. 2A, in a partially folded position.

The bridge 38 and the living hinges 44, 46, 48 enable the inner sections 20, 22 to be folded into the respective outer sections 14, 16, as shown in FIGS. 2D-2G. The inner section 20 is lifted up and rotated about the bridge 38, in the direction of the arrow A. The bridge itself rotates 180 degrees about the first living hinge 44, to position the rim portion 40 on top of, or overlapping, the rim 36*a*. The bridge 38 also rotates about the middle hinge 48 and lower hinge 46 to position the wall portion 42 of the bridge in alignment with the inside surface of the wall 50 of the outer section 14, as shown in FIG. 2E. When the rim portion 40 lines up on top of the rim 36*a*, and the wall portion 42 lines up along the wall 50, the pillow 24 is positioned inside the outer section 14.

Figure 2F:
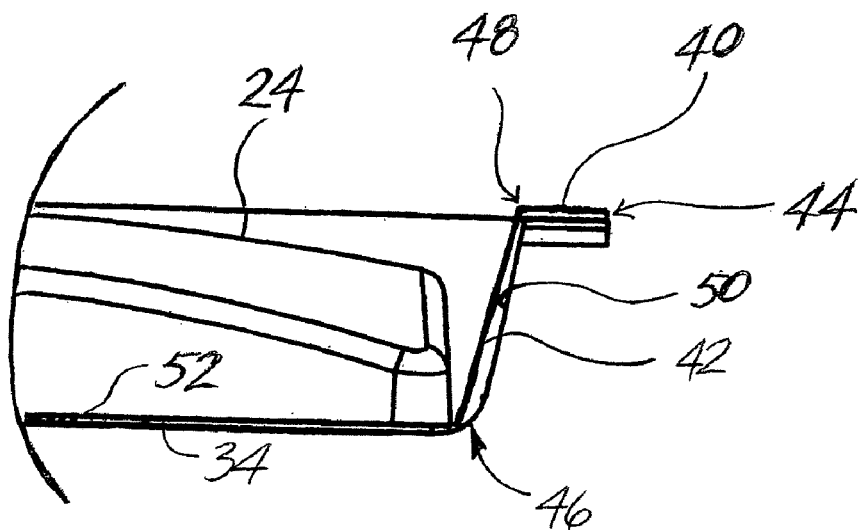
FIG. 2F is an enlarged view of an end of the reusable shipping container of FIG. 2A, in a folded position.
Figure 2G:
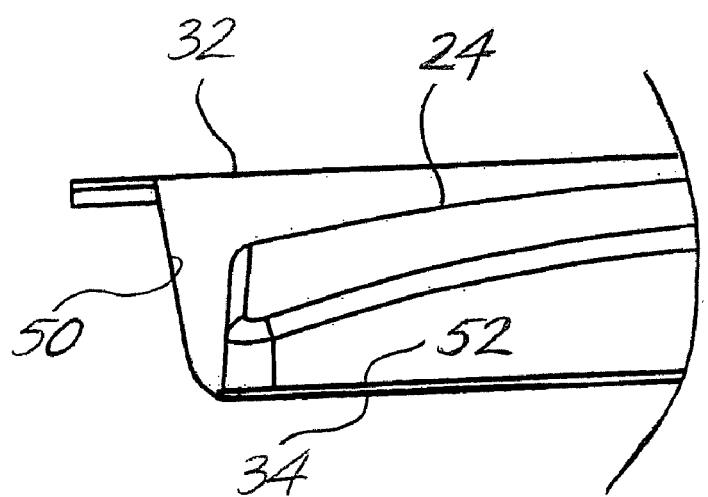
FIG. 2G is an enlarged view of an end of the reusable shipping container of FIG. 2A, in a folded position.

The wall portion 42 of the bridge 38 has a length D1 (see FIG. 2C) that is the same as the depth D1 (see FIGS. 2D-2E) of the outer sections 14, 16. Thus, when the bridge 38 is rotated about the hinge lines 44, 46, 48 to position the pillow inside the outer section, the wall portion 42 of the bridge lines up with the inside wall 50 of the outer section. Because the length of the wall portion 42 is the same as the height of the wall 50 (the depth D1), the wall section 42 extends all the way down along the wall 50 to the bottom 34 of the outer section, as shown in FIG. 2F. The bridge thus positions the pillow 24 on the bottom of the outer section such that the perimeter edge 52 of the pillow 24 rests on the inside surface of the bottom 34, as shown in FIGS. 2F and 2G. FIGS. 2F and 2G show close up, enlarged views of the right and left ends, respectively, of the shipping container shown in FIG. 2E, in a fully folded position.

As shown in FIG. 2E, the inner sections 20, 22 have a maximum depth D2 at the center of the convex pillows 24, 26. This depth D2 is greatest at the center of the pillow's convex bulge 25. The depth D1 is greater than the depth D2. As a result, when the pillow 24, 26 is positioned inside the outer section 14, 16, the convex bulge 25 of the pillow will not reach all the way to the open top 32 of the outer section 14, 16. This difference in depths creates the space 27 between the two pillows (shown in FIG. 2A). In one embodiment, the space 27 is approximately 0.25 inches wide.

To ship an item in the reusable shipping container 10, the two inner sections 20, 22 are folded about the bridge 38 as described above to position the two pillows 24, 26 inside the two outer sections 14, 16. The item 58 is then placed on one of the two pillows, which resiliently supports the item on the convex bulge 25 of the pillow. The outer sections are then folded together about the hinge 18, causing the two pillows 24, 26 to deflect to accommodate the item 58 between them. The rims 36*a*, 36*b* of the two outer sections are brought into contact with each other and secured together to close the outer clamshell container 12, with the item 58 inside.

In the embodiment shown in FIGS. 2A-G, each inner section 20, 22 includes only one pillow, and each pillow 24, 26 extends substantially across the length L of the outer section 14, 16. Thus, the pillow 24, 26 occupies substantially all of the space inside the outer section 14, 16. The embodiments utilizing one domed pillow per inner section snap back into shape more easily, with each pillow regaining its convex shape. However, in other embodiments, each inner section 20, 22 could include two or more pillows, with each pillow extending across half or less than half of the length L of the outer section 14, 16. The pillows 24, 26 are shown with smooth surfaces and smooth bulges 25, but in other embodiments the surfaces of the pillows may include indentations, corrugations, ripples, and/or other suitable shapes and textures to provide additional support to the item 58 during shipment.

Another embodiment of a shipping container 10' is shown in FIGS. 3A-3C. Throughout the figures, like reference numerals have been used to identify like elements and parts, with the embodiment in FIGS. 3A-3C identified by numbers with primes. The elements identified with primes are the same as previously described, except where they are described differently below.

The container 10' has a wider bridge 38' than the bridge shown in FIGS. 2A-2E. In this embodiment, the inner sections 20', 22' each have a ledge or flange 62' on the perimeter edge 52', opposite the bridge 38'. The outer section 14' has a corresponding ridge 64' formed on the inside surface of the wall 50, opposite the bridge 38'. To position the pillow 24' inside the outer section 14', the user pushes on the pillow 24' to snap the flange 62' into place under the ridge 64'. Because the material is flexible, the pillow and flange 62' can bend to move around the ridge 64', so that the flange snaps into place. The flange 62' will then retain the pillow 24' in place inside the outer section 14'. To remove the pillow, the user can similarly push on the pillow to pop the flange 62' back out from under the ridge 64'.

In the embodiment shown in FIGS. 3A-3C, the two outer sections 14', 16' are secured together by means of a channel lock formed on the two rims 36*a'*, 36*b'*. The outer section 14' includes a ridge or lip 78' that fits snugly into a corresponding channel or groove 80' formed in the outer section 16'. The snug, friction fit between the ridge and channel holds the two outer sections together.

Other means of securing the two outer sections together are possible. For example, conventional zip or cable ties 72 (shown in FIGS. 1A-1B) can be passed through aligned openings 60a, 60b (shown in FIG. 2C) in the rims 36a, 36b of the outer sections. These openings 60a, 60b align with each other when the outer sections are folded together, so that a cable tie can be passed through both openings to secure the two rims 36a, 36b together.

FIGS. 1A and 1B also show another feature of the reusable shipping container 10. The first outer section 14 includes legs or protrusions 68 on the outer surface of the bottom wall 34. These protrusions 68 match indentations 70 formed in the outer surface of the second outer section 16. These protrusions and indentations allow several containers 10 to be stacked together, with the protrusions on one container fitting into the indentations on the container below it. The stack of containers is more stable with these nesting protrusions and indentations. The containers 10 are also stackable when they are opened and unfolded (as shown in FIG. 2C). A second container can be easily placed on top of the first one, with the pillows and outer sections nesting inside each other to form a space-saving stack.

In the embodiment shown in FIGS. 1A and 1B, a sleeve 74 for a shipping label 76 is added to the molded container 10 on the outside surface of one of the two outer sections. The sleeve 74 can be made out of the same material that forms the entire container, such as polyethylene terephthalate (PET). For example, a rectangular sheet of PET can be thermally bonded, such as by radio frequency welding, to the outer container on three sides. The fourth side is left open so that the shipping label 76 can be inserted under the sheet and later removed. In addition to the shipping label, the outside surface of the clamshell container 12 can include embossed designs, words, or patterns to indicate information about the package, the material, the shipping company, or other information, or for aesthetic purposes.

The reusable container 10, 10' can be reused to ship various items of different sizes and shapes. The container 10, 10' does not need any disposable cushioning materials such as packing paper or peanuts that are discarded after use. Instead, the entire container can be used again to ship another item. When a first item is removed from inside the container, the two pillows 24, 26 spring back into their convex shape, each regaining its convex bulge 25. A new item of a different size and/or shape can then be placed between the two pillows, which will again deflect into a concave bowl 25a to receive the item snugly between them. The container 10, 10' can therefore be used multiple times.

The reusable shipping container 10, 10' can be manufactured in various sizes in order to accommodate various items for shipment. In one embodiment, the outer sections 14, 16 are approximately 9.90 inches in width W, 13.23 inches in length L, and 2.02 inches in depth D1. The inner container and pillow are scaled to fit inside the variety of sizes of outer sections.

Additionally, in an exemplary embodiment, the container (such as container 10, 10') is integrally formed from one material, so that the container is one continuous piece. For example, in one embodiment, the container is formed from recycled polyethylene terephthalate (PET). A single sheet of PET can be vacuum-formed into the shape of the container 10, 10'. For example, in one embodiment, the container is formed from a sheet of PET approximately 0.045 inches thick and 4 feet wide. The sheet is heated until it starts to sag, so that it can becomes pliable. The pliable sheet is then pulled into a female mold in the shape of the open container, such as the container 10 shown in FIG. 2C. The mold includes very small holes connected to a vacuum pump, so that the PET sheet can be sucked down into the mold, conforming to the edges of the mold. The sheet is stretched in some places and pressed together in other places to alter the thickness of the resulting shaped container. For example, although the sheet, in one embodiment, starts with a uniform thickness of 0.045 inches, the portion of the sheet that is pulled into the pillow mold is stretched so that the resulting pillow is thinner than 0.045 inches, giving it additional flexibility. Similarly, the sheet gathers together along the corners of the outer sections, so that these corners have a thickness greater than 0.045 inches, giving them additional rigidity. After the sheet is formed into the mold, it is removed from the mold and the perimeter of the container 10 is cut around the molded portion of the sheet. While the molded portion is still warm, it is folded along the fold lines, and then cooled.

The recycled, reusable shipping container 10, 10' provides an efficient and environmentally friendly method of shipping. In one embodiment, the container is formed 100% from recycled material, such as PET from used water bottles. The molded, one-piece container is then used to resiliently cushion and protect an item during shipment, without requiring any additional cushioning or packing material. When the container reaches its destination, the item is removed and the pillows inside recover their shape, ready for another shipment. Another item of the same or a different size can then be shipped to another location in the same shipping container 10, 10'.

Business and consumers can reuse these containers multiple times to ship items back and forth. For example, a manufacturer can ship full ink cartridges to consumers, who can ship empty ink cartridges back to the manufacturer. Businesses can use these containers to ship items or documents back and forth between various sites and warehouses. Businesses can use the containers to ship orders to customers or to recall items or accept returns (such as shipping small electronics, cell phones, eyeglasses, medical supplies, etc.). Consumers can use them for normal everyday shipping, and can drop them off at a post office or shipping center to be reused again. After hundreds of uses, the shipping container 10, 10' can simply be recycled into a new container, according to the method described above.

Another embodiment of the invention is shown in FIGS. 4-8. In this embodiment, the shipping container includes two outer trays and two inner pillows or cushions. The trays and pillows are formed as separate pieces and assembled separately, rather than being formed as one continuous, connected piece. As a result, in this embodiment, the container does not utilize any folding hinges. The two outer trays are engaged together with the two pillows inside, and the pillows deflect to accommodate an item between them, as described before. The container can be reused many times without creating any waste material. Additionally, the outer trays and inner pillows can be mixed and matched to create shipping containers of varying sizes and/or flexibility, depending on the item being shipped. In one embodiment, the pillows and trays are made of the same material, for example, recycled polyethylene terephthalate (RPET).

Figure 4:
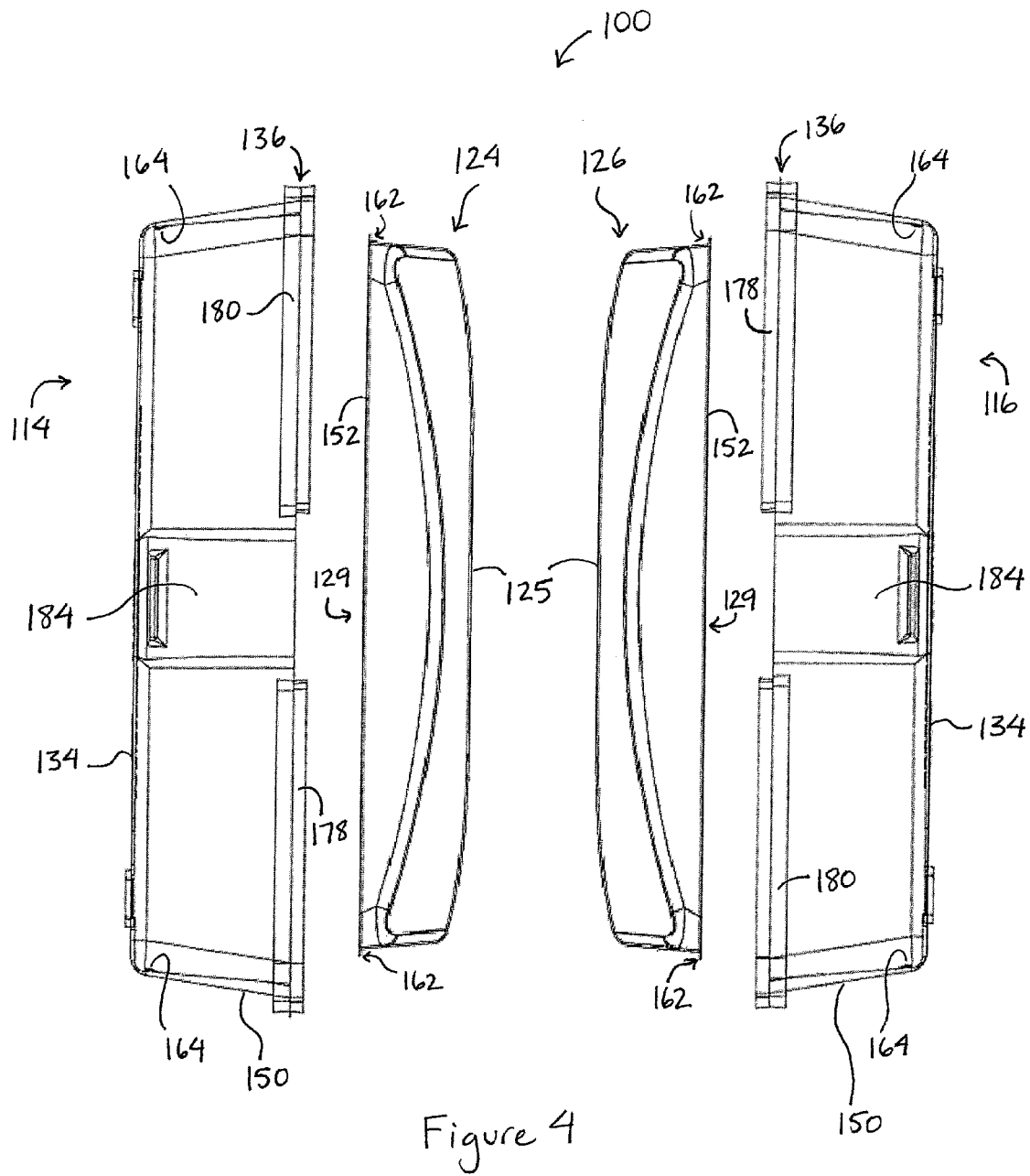
FIG. 4 is an exploded view of a reusable shipping container according to an embodiment of the invention.

As shown in FIG. 4, a reusable shipping container 100 includes two outer trays 114, 116 and two inner cushions or pillows 124, 126. These components are separate from each other, formed as separate pieces. The container 100 is assembled by placing the pillows 124, 126 in the respective trays 114, 116, and then bringing the two trays together. The two trays engage each other to close the container 100, with the two cushions or pillows facing each other inside the trays. Each pillow is shaped as an open, hollow dome 125, wherein the dome 125 is open by having an open bottom side 129. The dome is not inflated or pressurized. The dome 125 of each pillow deflects to cushion and support an item between the two pillows during shipment, and the shape memory of the material returns each pillow to its domed shape when the item is removed.

In one embodiment, each tray 114, 116 has an outer rim 136 with mating channel lock features, in order to engage two trays to each other. Specifically, at two opposite corners of each tray, the rim 136 includes a raised protrusion or ridge 178, and at the other two opposite corners the rim 136 includes a matching channel or depression 180. When the two trays 114, 116 face each other, the ridges 178 on one tray are aligned with the channels 180 on the other tray. The ridges 178 fit into the channels 180, forming a channel lock that secures the two trays together. The trays can be disengaged by pulling them apart with sufficient pressure to remove the ridge 178 from the channel 180. The channel lock features are also shown in perspective view in FIG. 5. The channel lock is one example, and in other embodiments, other mating or locking features may be used.

Referring again to FIG. 4, the two cushions or pillows 124, 126 fit inside the respective trays 114, 116, with the domes 125 of the pillows facing outwardly (facing each other) and extending substantially across a length of the tray. As described before with respect to other embodiments, the pillows 124, 126 are made of a flexible material that is capable of deflecting to receive an item between the two pillows. The pillows deflect into substantially concave bowls around the item, and then recover their shape when the item is removed. As in other embodiments described above, the pillows 124, 126 are hollow domes, having only one layer or wall that forms the dome 125, with empty space below the dome. Each pillow 124, 126 is open and hollow from the opposite bottom side 129. The pillows are not sealed or airtight, and they are not inflated or pressurized. The pillows use the resilient properties of the material to provide cushioning, without needing extra cushioning like the air in a balloon, or a soft material such as foam, or an elastic (stretching) material such as a film. As a result, the pillows 124, 126 continue to provide cushioning to the item being shipped even if a portion of the pillow is punctured, dented, or damaged.

As used herein, the term concave bowl or deflecting into a substantially concave bowl means that the cushion or pillow deflects from its natural convex or dome shape in order to receive an item. It does not mean, however, that the deflected shape of the pillow is necessarily a symmetric bowl. Rather, the shape that the pillow takes will depend on the shape of the item being shipped, and the deflected pillow may include ripples or waves in the material as it bends around the item. Thus, the description of a concave bowl is meant to indicate that the pillow deflects from its natural convex shape in order to receive the item between the two facing pillows during shipment. Accordingly, the deflection may be described as "substantially" concave to distinguish the natural convex shape.

As shown in FIG. 4, the pillows 124, 126 include a perimeter edge 152 along the perimeter of the open bottom side 129. The perimeter edge 152 includes an extension such as a flange 162 on one or more sides of the pillow 124, 126. The flange 162 may be included on only one side of the pillow, or on two, three, or all four sides (see FIG. 8A). The flange 162 is sized and positioned to fit underneath a corresponding protrusion such as a ridge 164 formed on the inside surface of a side wall 150 of the tray 114, 116. When the pillow 124, 126 is placed into the tray 114, 116, the flange 162 snaps into place under the ridge 164 to retain the pillow inside the tray. The pillow is removed from the tray simply by bending the pillow slightly to release the flange 162 out from under the ridge 164.

In one embodiment, the first tray 114 and the second tray 116 are interchangeable. Either tray 114, 116 can function as the top tray or the bottom tray in the assembled container 100. With the channel lock features 178, 180 formed on opposite corners of each tray, the two trays mate together when they face each other, as shown in FIG. 4. Thus, for example, there is no need to create separate molds for a first tray with male locking features and a second tray with female locking features, in order to create the assembled container 100. Both trays are manufactured from the same mold and can be stored together in inventory. In one embodiment, the two trays are identical. Similarly, in one embodiment, the pillows 124, 126 are interchangeable. In one embodiment, the pillows are identical and are made from the same mold. As a result, the pieces that create the container 100 are interchangeable, and inventory is simplified.

Figure 5:
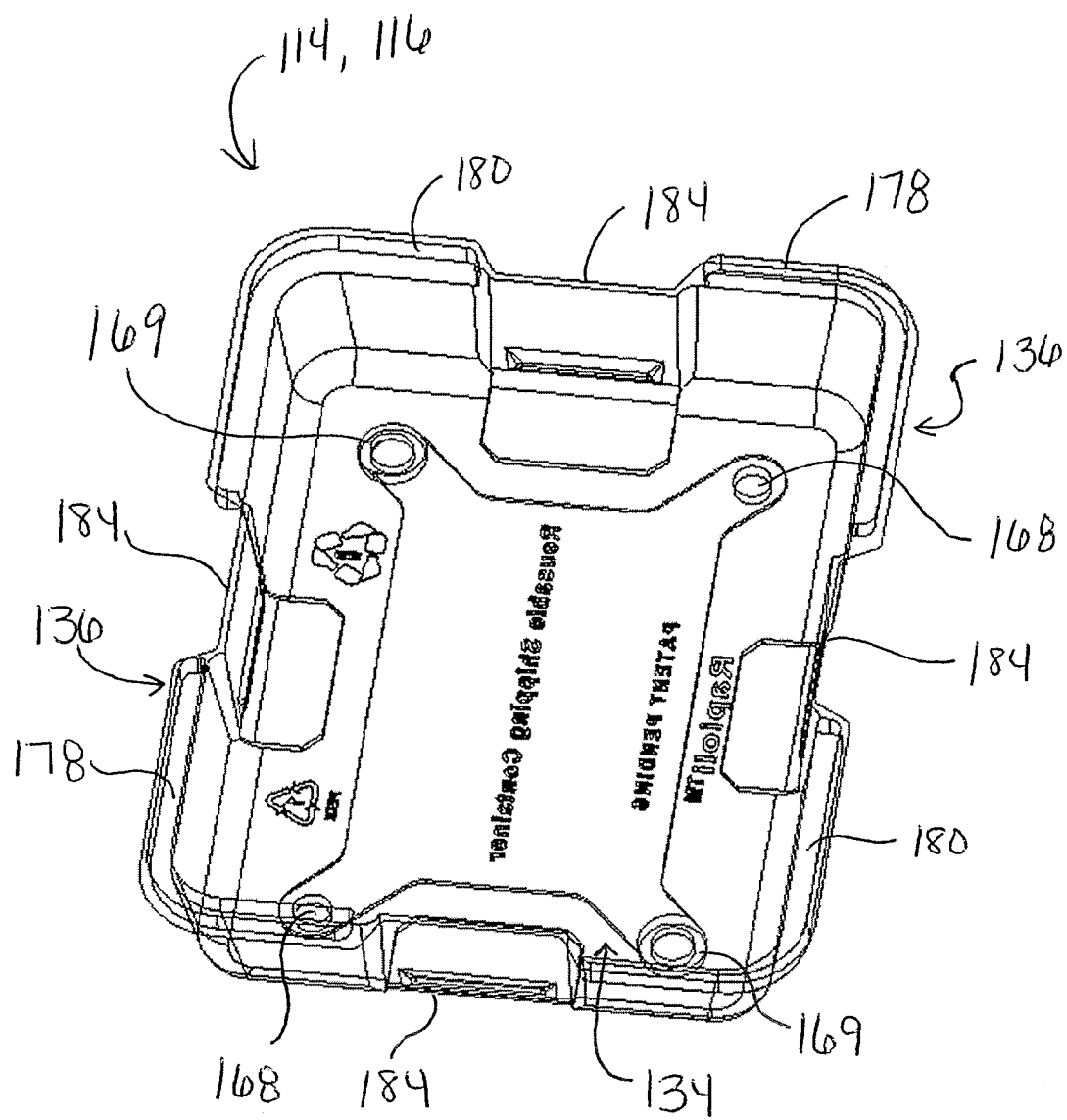
FIG. 5 is a perspective view of a tray according to the embodiment of FIG. 4.
Figure 7:
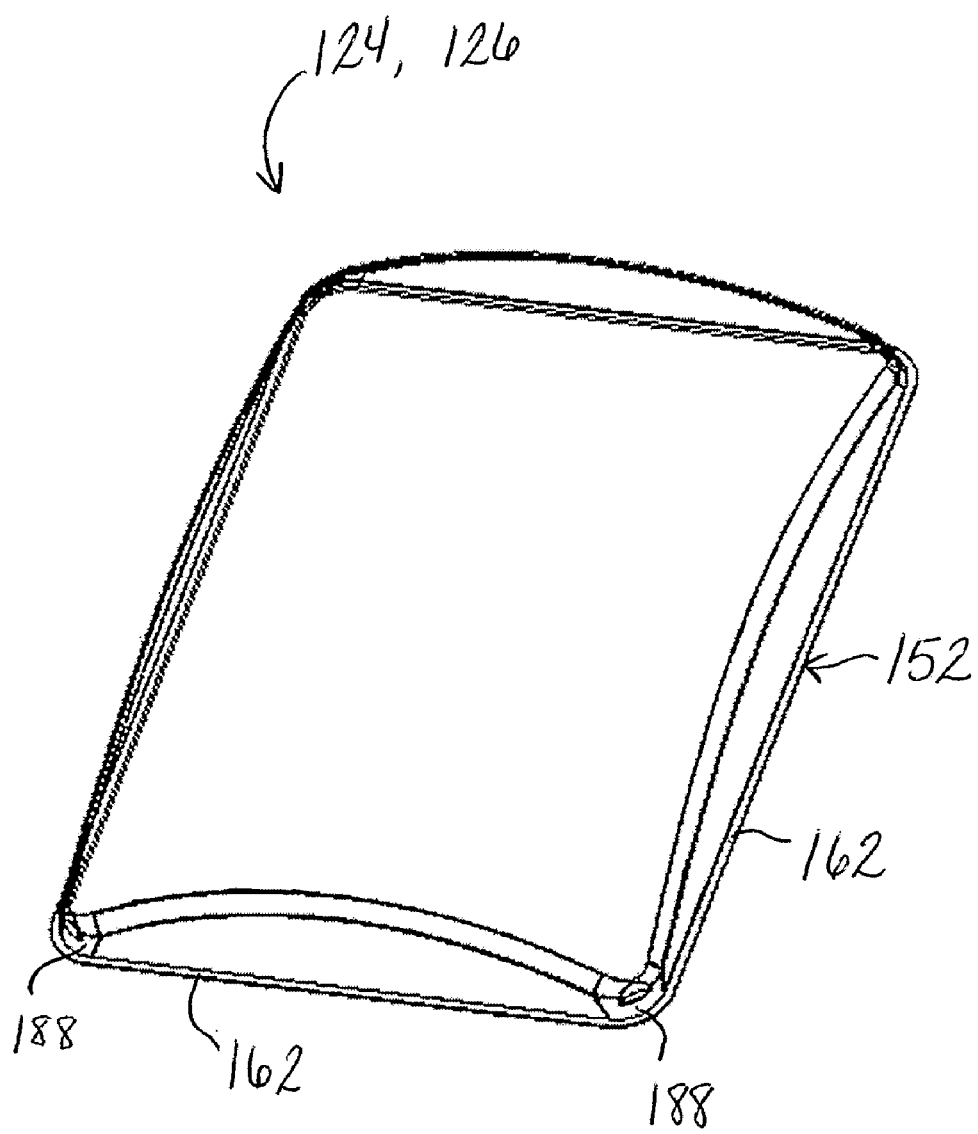
FIG. 7 is a perspective view of a pillow according to the embodiment of FIG. 4.
Figure 8B:
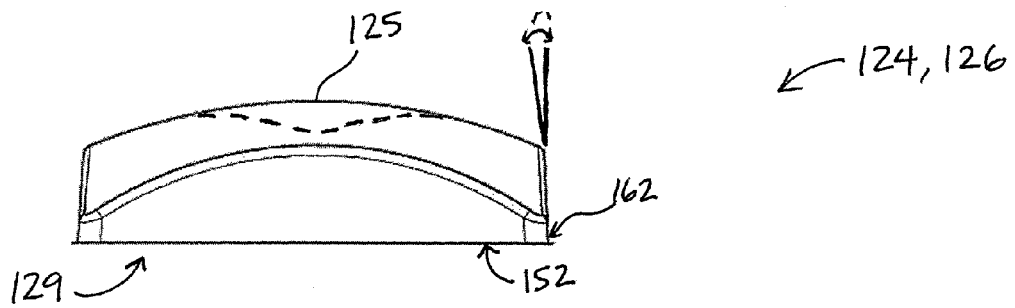
FIG. 8B is a front elevational view of the pillow of FIG. 7.
Figure 8A:
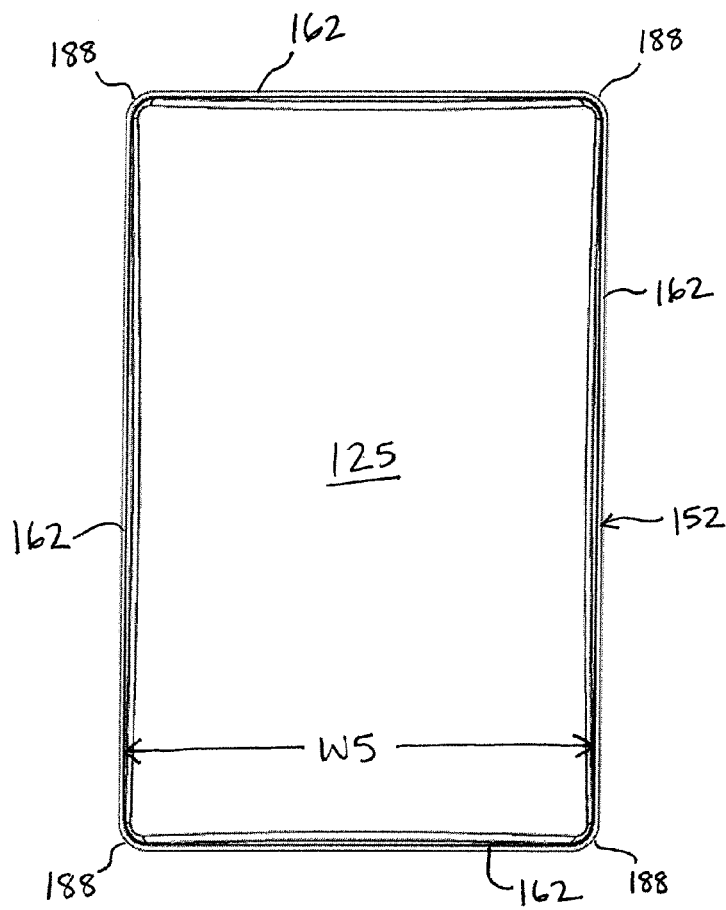
FIG. 8A is a top view of the pillow of FIG. 7.
Figure 8C:
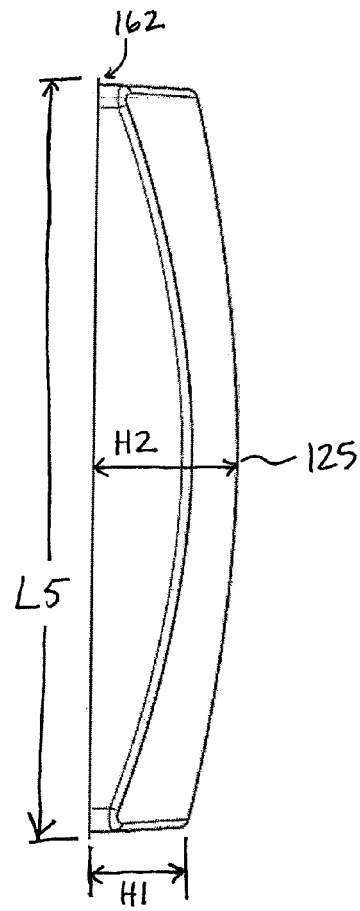
FIG. 8C is a side elevational view of the pillow of FIG. 7.

Turning to FIG. 5, a perspective view of the tray 114, 116 is shown. As mentioned above, in one embodiment the tray includes channel lock features on the rim 136, with ridges 178 formed on opposite corners, and channels 180 formed on opposite corners of the tray. Optionally, in one embodiment the rim 136 also includes cutout areas or depressions 184 in one or more sides of the tray. The depressions 184 on one tray 114 align with the depressions 184 on the mating tray 116 to create channels for packaging tape, which can be used to further secure the two trays together. Optionally, the bottom wall 134 of the trays 114, 116 has an indented area 186 for a shipping label such as label 76 (see FIG. 1A).

FIG. 5 also shows the nesting features on the bottom wall 134 of the tray. The bottom wall 134 includes feet 168 on two opposite corners, and rings 169 on the other two opposite corners of the bottom wall 134. When the trays 114, 116 are mated together to form a container 100, these feet and rings are present on both trays, on both the top and bottom of the container 100. Then, when the containers are stacked vertically, the feet 168 on the bottom of the upper tray fit into the rings 169 on the top of the lower tray. This keeps a vertical stack of containers more stable, with the feet 168 nesting in the rings 169. In other embodiments, the feet and rings can be formed in other shapes, such as having depressions rather than rings. The particular feet 168 and rings 169 shown are simply one example of the nesting features on the bottom wall 134, and other nesting features can be used.

The tray 114, 116 is shown in additional views in FIGS. 6A-6C. In the embodiment shown, the tray 114, 116 tapers outwardly at angle B from the bottom wall 134 to the open top of the tray at the rim 136, such that the area of the open top at the rim 136 is larger than the area of the bottom wall 134. FIGS. 6B and 6C also identify the length L2 and width W2 of the tray 114, 116 measured at the rim 136.

The pillow 124, 126 is shown in more detail in FIGS. 7 and 8A-8C. In the embodiment shown, the pillow has a flange 162 that extends around all four sides of the perimeter edge 152 of the pillow. The pillow rises from height H1 at the perimeter of the pillow to height H2 at the peak of the dome 125 (see FIG. 8C). In one embodiment, the height H1 is approximately 2 inches, and the height H2 is approximately 3 inches (for a pillow that is approximately 10 inches by 16 inches in length L5 and width W5). Without any force applied to the pillows, they remain naturally in this convex, domed shape. When a force is applied to the pillows, such as by an item inside the container, the pillows deflect into a concave bowl surrounding the item, as shown by the dotted lines in FIG. 8B. The pillow 124, 126 has rounded corners 188 and tapers slightly inwardly at angle A from the bottom edge 152 to the top surface of the pillow.

Figure 9:
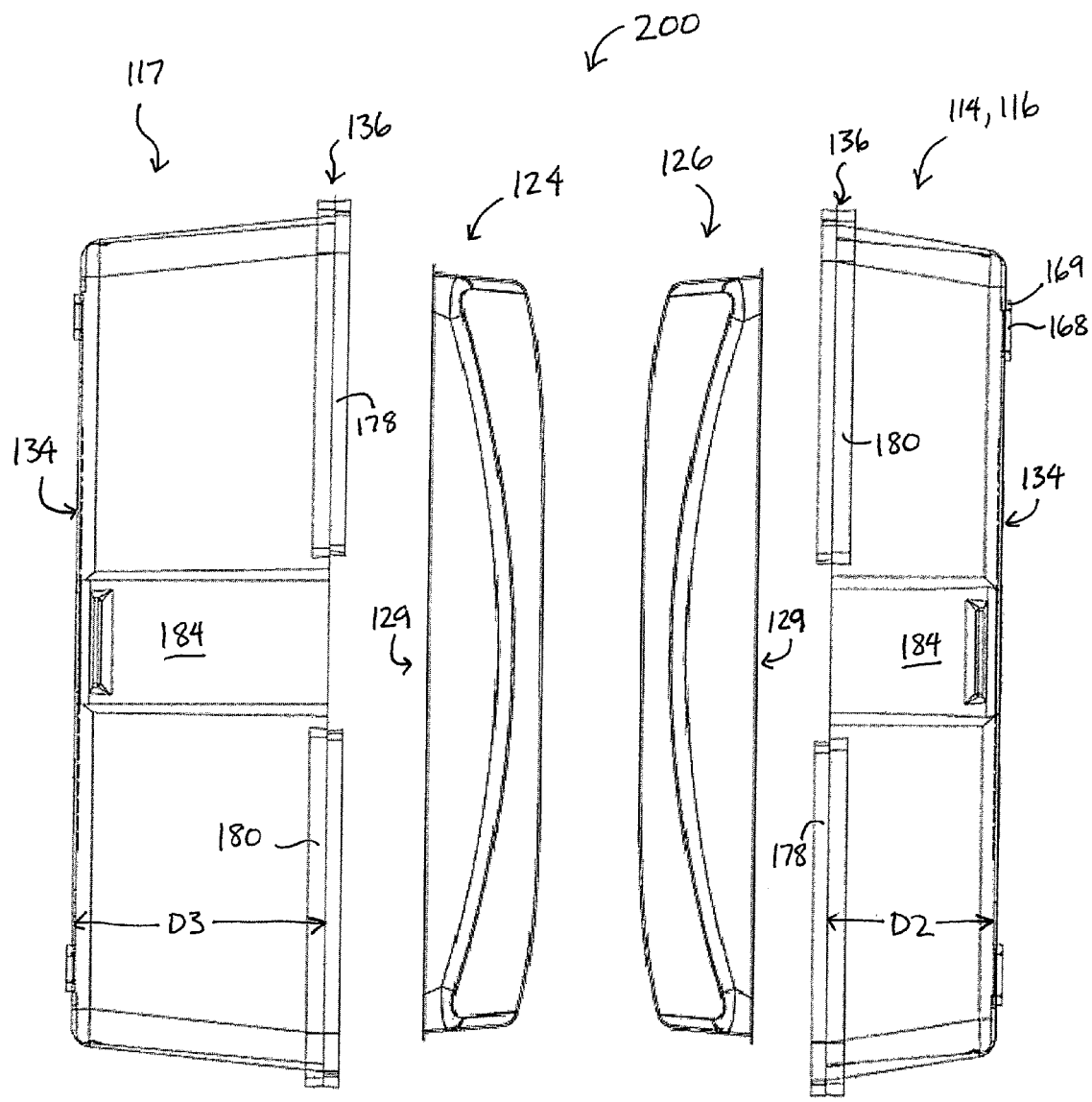
FIG. 9 is an exploded view of a reusable shipping container according to an embodiment of the invention.

In one embodiment of the invention, a system for shipping items includes several pillows and trays having varying sizes and thicknesses, and these pillows and trays can be mixed and matched to form containers of varying sizes, according to the item being shipped. For example, in FIG. 9, the tray 114, 116 is matched with a deeper tray 117 to create a deeper container 200. The tray 114, 116 has a depth D2, and the tray 117 has a larger depth D3. However, the perimeter of the rims 136 of each tray match, and the channel lock features (channels 180 and ridges 178) also match, so that the trays can be used together to form the container 200. This container 200 can be used to ship items that are larger than items shipped in the container 100. For even larger items, another container 300 can be made with two trays 117, each having the larger depth D3. Thus, three different sized containers 100, 200, 300 can be made from two different sized trays 114/116, 117. The same pillows 124, 126 can be used in any of these containers 100, 200, 300, as indicated in FIG. 9.

Figure 10:
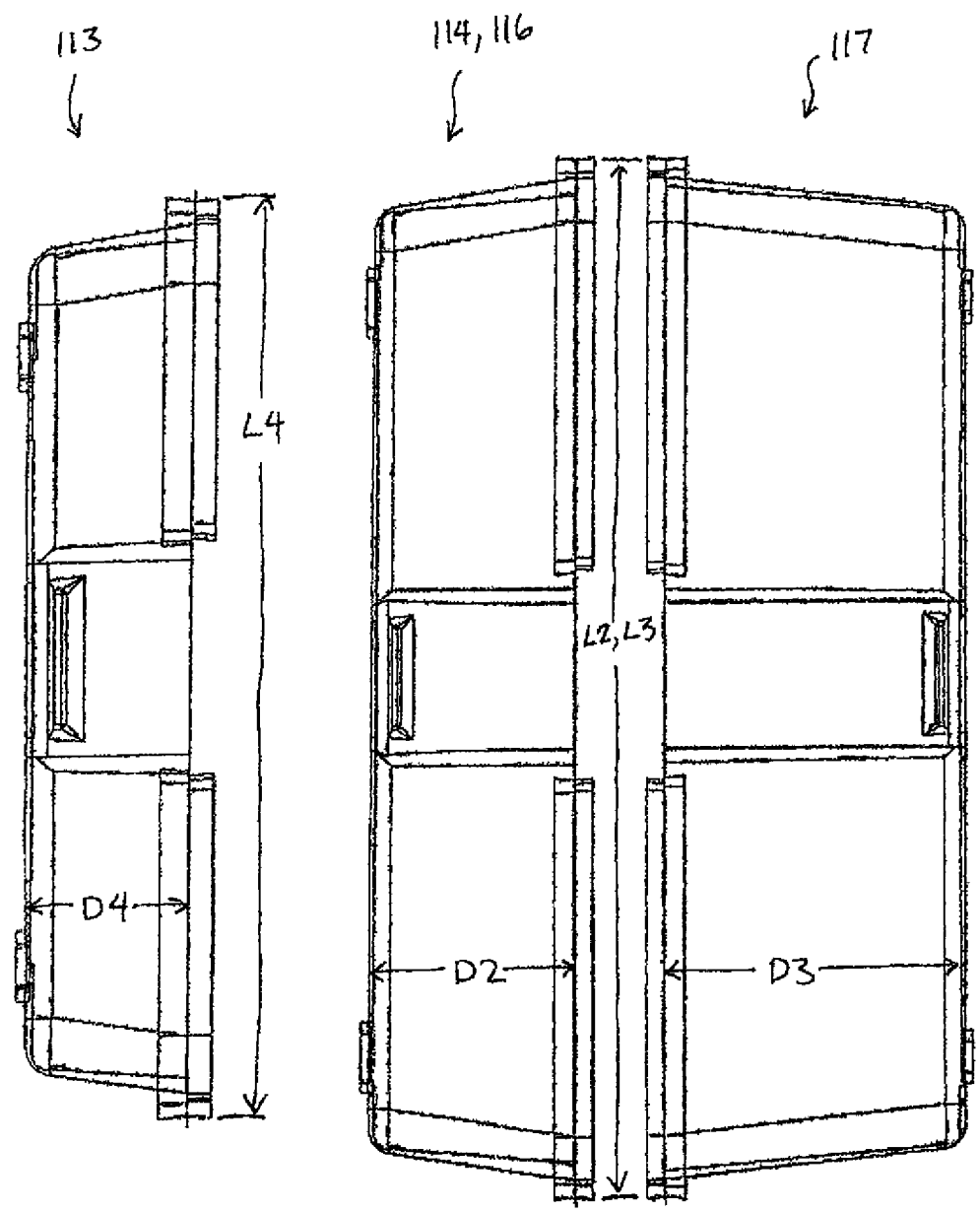
FIG. 10 is an exploded view of trays of different sizes, according to an embodiment of the invention.

The trays can also be made in different perimeter sizes at their open tops, as shown for example in FIG. 10. The trays 114, 116, and 117 have the same perimeter size along their rims 136, so that they can mix and match together to create the container 100, 200, 300. Another smaller tray 113 with a smaller perimeter is also shown, and this tray can mate with other trays 113 to create a smaller container 400 for smaller items. These trays 113, 114, 116, 117 are shown as non-limiting examples, and trays of many different dimensions can be created to provide containers of desired sizes.

In one embodiment, the tray 113 is approximately 12 inches in length L4 and 9 inches in width (as measured at the perimeter of its rim 136) and approximately 2 inches in depth D4 (see FIG. 10). In one embodiment, the tray 114/116 is approximately 18 inches in length L2, 12 inches in width W2, and 3.375 inches in depth D2 (see FIGS. 6A-6C and FIG. 10). In one embodiment, the tray 117 is approximately 18 inches in length L3, 12 inches in width, and 5 inches in depth D3 (see FIG. 10). Thus, two trays 113 form a container that is approximately 4 inches deep. Two trays 114/116 form a container approximately 6.75 inches deep. One tray 114/116 combined with one tray 117 form a container approximately 8.375 inches deep. Two trays 117 form a container approximately 10 inches deep.

In one embodiment, the thickness of the trays is substantially uniform throughout the tray, allowing for some manufacturing tolerances and variances such as at the corners. For a tray that is about 9 inches by 12 inches in size, made from RPET, the thickness is approximately 0.05 inches. In other embodiments the thickness of the tray can range between approximately 0.03 and 0.06 inches.

The pillows can also be made in varying sizes, to fit into the trays 113, 114/116, 117. In one embodiment, the tray is approximately 12 by 18 inches, and the pillow that fits into this tray is approximately 16 inches in length L5 by 10 inches in width W5 (see FIGS. 8A-8C). This size is measured at the perimeter edge 152. The pillow is smaller than the opening of the tray due to the tapered shape of the tray, which has a smaller area at the bottom wall 134 than at the rim 136 (see FIG. 6B). In another embodiment, the tray is approximately 9 by 12 inches, and the pillow that fits into this tray is approximately 7.5 by 10.5 inches.

Additionally, the thickness of the pillows can be adjusted to provide the desired degree of flexure. The pillows use the flexible properties of the material to provide cushioning to the item, and to regain their shape after the item is removed. Different pillows can be made with different thicknesses, so that the desired amount of flexibility is provided depending on the item being shipped. For example, when a very thin or small item is shipped, the pillow need not flex as far as when a larger item is shipped, and therefore a thicker pillow can be used to provide more durability and less deflection.

In one embodiment, the pillow is approximately 7.5 inches by 10.5 inches in size, and the thickness is approximately 0.025 inches. The thickness of the pillows is substantially constant throughout the pillow, allowing for some manufacturing tolerances and variability. In another embodiment, the pillows are approximately 10 inches by 16 inches in size, and the thickness is approximately 0.03 inches. In other embodiments, the thickness of the pillow ranges between approximately 0.025 and approximately 0.03 inches. In another embodiment, the thickness of the pillow ranges between approximately 0.02 and 0.04 inches.

In one embodiment, the trays 114, 116 are transparent. The shipping label can be placed inside the container and will be visible through the transparent tray. Other informational material can also be placed inside the tray, against the bottom wall 134 or a side wall 150, to provide information about the item or the shipper or recipient, and/or logos, advertising material, ingredients, etc. In another embodiment, the trays 114, 116 are made in various colors, and these trays can be mixed and matched, including with transparent trays, as desired. The pillows 124, 126 can also be made in various colors, including transparent, and various degrees of transparency/opacity. In other embodiments, information can be molded directly into the trays 114, 116 or pillows 124, 126, such as molding a "recycle" symbol into the tray to indicate that the tray can be recycled.

Another tray 215 according to an embodiment of the invention is shown in FIGS. 11A-C. The tray 215 shows a few examples of different shapes and features that the tray can include. For example, the tray 215 includes indented areas 284 for packing tape, but in this case the rim 236 has a straight edge, and does not include cut-outs for these tape areas 284 (compare to FIG. 6A). The tray 215 has a channel lock that includes two ridges 278 at one end of the tray 215, and two matching channels 280 at the opposite end of the tray, rather than at opposite corners as in FIG. 5. The tray 215 also includes ridges or bumps 290 on the outside surface of the side walls 250 of the tray, which the user can grip to separate two engaged trays 215. In the embodiment shown, the ridges 290 are fowled as three sets of straight ridges near each corner of each side wall 250, although more or fewer bumps and ridges can be provided in other embodiments. In one embodiment, the tray 215 is approximately 5 inches in width (measured at the rim 236), 7 inches in length (also measured at the rim 236), and 2 inches in depth (measured from the open top to the bottom wall 234). In another embodiment the tray 215 is approximately 9 inches in width, 12 inches in length, and 2 inches in depth.

The tray 215 may also include one or more features described above with respect to other embodiments, such as feet 269, rings 268, and indented area 286 for a shipping label.

In one embodiment, the pillows and the trays are made from the same material, such as polyethylene terephthalate (PET) or recycled polyethylene terephthalate (RPET). Both the tray and pillow can be formed from the same material, even though the tray is comparatively more rigid than the pillow. In order to accomplish this, the pillow and tray can be formed with different thicknesses. For example, in one embodiment the tray has a greater thickness than the pillow, in order to be more rigid and sturdy, to provide the outer protection for the container. The pillow is made with a smaller thickness in order to be more flexible, to deflect around the item inside the container.

After the pillows and trays have been used many times, or after they become damaged or worn, they can simply be recycled again into new trays and pillows. The RPET material from the trays and pillows need not be discarded or thrown away, even after the components become damaged, because they can simply be recycled again. The container is reusable indefinitely without generating any waste, and is therefore sustainable and environmentally friendly.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. A reusable shipping container for shipping an item, comprising:
   first and second outer trays, wherein the first and second trays are interchangeable; and
   first and second cushions, each cushion being received in one of the outer trays, and each cushion comprising a hollow dome having an open bottom side opposite the dome, the dome comprising a continuous and convex surface extending substantially across the respective outer tray,
   wherein the first and second outer trays are engageable to close the container, with the domes of the first and second cushions facing each other and the open bottom sides of the cushions facing away from each other, and
   wherein a perimeter edge of each cushion removably rests on a floor of the respective outer tray, the perimeter edge of each cushion resting at an outer periphery of the floor such that the open bottom side of the cushion has substantially the same dimensions as the floor,
   wherein each dome is made of a resilient material that is deflectable to receive an item between the facing domes during shipment, and wherein the cushions have shape memory that returns the cushions to their dome shape when such item is removed, the cushions retaining their dome shape when removed from the outer trays, and
   wherein the first and second trays and the first and second cushions are made from the same material.

2. The reusable shipping container of claim 1, wherein the first and second cushions are interchangeable.

3. The reusable shipping container of claim 1, wherein the material is polyethylene terephthalate.

4. The reusable shipping container of claim 3, wherein the material is recycled polyethylene terephthalate.

5. The reusable shipping container of claim 1, wherein each tray comprises a protrusion on an inside surface of the tray, and wherein each cushion comprises a flange that engages the protrusion to retain the cushion in the tray.

6. The reusable shipping container of claim 1, wherein each tray comprises mating channel lock features for mating with another tray.

7. The reusable shipping container of claim 6, wherein the mating channel lock features include a channel on at least one portion of each tray, and a ridge on at least one other portion of each tray, the channel and the ridge being positioned to mate with the corresponding channel and ridge of another tray when the two trays face each other.

8. The reusable shipping container of claim 1, wherein the first tray has a first depth and the second tray has a second depth that is greater than the first depth.

9. The reusable shipping container of claim 1, wherein each tray comprises a bottom wall, and wherein the bottom wall includes at least one foot and at least one protrusion dimensioned to receive the foot of another tray when the trays are stacked.

10. The reusable shipping container of claim 9, wherein the bottom wall comprises four corners, and first and second feet at two corners of the bottom wall, and first and second protrusions at the other two corners of the bottom wall.

11. A system for shipping items, comprising:
    a plurality of first trays, each first tray having a bottom wall, a side wall, and an open top, and having a first depth from the open top to the bottom wall; and
    a plurality of pillows, each pillow comprising a hollow dome opposite an open bottom, the dome comprising a continuous and convex surface, the dome being formed from a resilient material that is deflectable to receive an item between two facing domes, wherein the pillows have shape memory that returns the pillows to their dome shape when such item is removed, the pillows retaining their dome shape when removed from the respective trays, and
    wherein each pillow is sized to fit into one of the first trays, with the dome of the pillow facing outwardly toward the open top of the tray and with the open bottom of the pillow facing the bottom wall of the tray, and
    wherein each first tray is engageable with another tray to close the container, with the domes of the pillows facing each other, and wherein the trays are interchangeable, and
    wherein each pillow comprises a perimeter edge removably resting on the bottom wall of the respective tray, the perimeter edge of the pillow resting at an outer periphery of the bottom wall such that the open bottom of the pillow has substantially the same dimensions as the bottom wall of the tray, and
    wherein the plurality of trays and the plurality of pillows are made from the same material.

12. The system of claim 11, further comprising a plurality of second trays, each second tray having a bottom wall, a side wall, and an open top, and having a second depth from the open top to the bottom wall, and wherein the second tray is engageable with the first tray to close the container, and wherein the first and second depths are different.

13. The system of claim 11, wherein the material is polyethylene terephthalate, and wherein the plurality of trays have a first color and the plurality of pillows have a second color different from the first color.

14. A reusable shipping container for shipping an item, comprising:
    an outer container comprising first and second trays each comprising a rim, the first and second trays being engageable along their rims to close the outer container;
    a first pillow received into the first tray and extending substantially across a length of the first tray; and
    a second pillow received into the second tray and extending substantially across a length of the second tray,
    wherein each pillow comprises a hollow dome and an open bottom side, the dome comprising a continuous and convex surface,
    wherein the domes of the first and second pillows face each other when the outer container is closed,
    wherein the first and second pillows are resilient and deflect into a substantially concave shape to receive an item between them and wherein the pillows have shape memory that returns the pillows to their dome shape when such item is removed, the pillows retaining their dome shape when removed from the respective trays,
wherein the first and second trays are separate pieces and the first and second pillows are separate pieces,
wherein the first and second trays and the first and second pillows are made from the same material, and
wherein the first and second trays have a first thickness, and the first and second pillows have a second thickness, and the first thickness is greater than the second thickness, and
wherein each pillow comprises a perimeter edge opposite the dome, and wherein the perimeter edge of the pillow removably rests on a floor of the respective first or second tray, with the open bottom side of the pillow facing into the tray, the perimeter edge of the pillow resting at an outer periphery of the floor such that the open bottom side of the pillow has substantially the same dimensions as the floor.

15. The reusable shipping container of claim 14, wherein the each pillow contacts the respective first or second tray only at the perimeter edge of the pillow.

16. The reusable shipping container of claim 1, wherein each cushion contacts the respective tray only at the perimeter edge of the cushion.

* * * * *

UNITED STATES PATENT AND TRADEMARK OFFICE
CERTIFICATE OF CORRECTION

PATENT NO. : 8,047,378 B2  
APPLICATION NO. : 12/604370  
DATED : November 1, 2011  
INVENTOR(S) : Ken Eskenazi et al.

It is certified that error appears in the above-identified patent and that said Letters Patent is hereby corrected as shown below:

In the Drawings

FIG. 10, Sheet 15 of 16            Below drawing, insert -- Figure 10 --  
                                    As shown in attached Drawing Sheet Signed and Sealed this  
Twenty-sixth Day of March, 2013

Teresa Stanek Rea  
*Acting Director of the United States Patent and Trademark Office*